(12) United States Patent
Searer et al.

(10) Patent No.: US 8,356,797 B1
(45) Date of Patent: Jan. 22, 2013

(54) ADJUSTABLE SLIDEOUT SUPPORT APPARATUS AND METHOD

(76) Inventors: Darryl L. Searer, Ft Myers, FL (US);
Craig A. Searer, Elkhart, IN (US)

( * ) Notice: Subject to any disclaimer, the term of this patent is extended or adjusted under 35 U.S.C. 154(b) by 414 days.

(21) Appl. No.: 12/759,688

(22) Filed: Apr. 13, 2010

Related U.S. Application Data

(60) Provisional application No. 61/169,001, filed on Apr. 14, 2009.

(51) Int. Cl.
*B66F 3/36* (2006.01)
*B66F 1/04* (2006.01)

(52) U.S. Cl. ............... 254/100; 254/98; 254/108

(58) Field of Classification Search .......... 254/100, 254/134, 108–111, 98, 103
See application file for complete search history.

(56) References Cited

U.S. PATENT DOCUMENTS

| | | | |
|---|---|---|---|
| 6,736,371 B1 * | 5/2004 | Burrows | 254/133 A |
| 7,628,369 B2 * | 12/2009 | Chen | 248/354.3 |
| 2002/0179134 A1 * | 12/2002 | Suh | 135/141 |
| 2007/0012346 A1 * | 1/2007 | Choi | 135/114 |

* cited by examiner

*Primary Examiner* — Basil Katcheves
*Assistant Examiner* — Beth Stephan
(74) *Attorney, Agent, or Firm* — Rick B. Yeager

(57) ABSTRACT

An adjustable support apparatus for a recreational vehicle permits rapid height adjustment with a spring mechanism of a handle-nut assembly on a threaded rod. A portion of the threaded rod is inserted into the hollow portion of a jackscrew assembly. A tab on the handle-nut assembly includes an oversized hole intersecting a threaded hole for engaging the threaded rod. An approximate desired height of the support apparatus is accomplished by pushing a tab inward and sliding the handle-nut assembly to a desired position on the threaded rod. A fine adjustment to the desired height, if required, is made by turning the handle nut assembly so that it travels with respect to the threaded rod.

6 Claims, 2 Drawing Sheets

ADJUSTABLE SLIDEOUT SUPPORT APPARATUS AND METHOD

RELATED APPLICATIONS

This U.S. non-Provisional patent application is related to US Provisional Application No. 61/169,001 filed Apr. 14, 2009 by applicants, and claims the priority date of that application.

BACKGROUND

1. Field of Invention

The field of the present invention relates generally to an adjustable support apparatus for a pullout portion of a trailer or RV. The device may be provided with original equipment or as an after-market device.

2. Prior Art

Prior art adjustable supports for the pullout portion of a trailer or RV typically require a substantial effort to properly adjust height. For instance, supports having threaded rods may require ten or more revolutions per inch of adjustment height. There is a need for a rapid-adjustment device to make the vertical support adjustment process faster and easier.

DESCRIPTION OF EMBODIMENT

Figure 1:
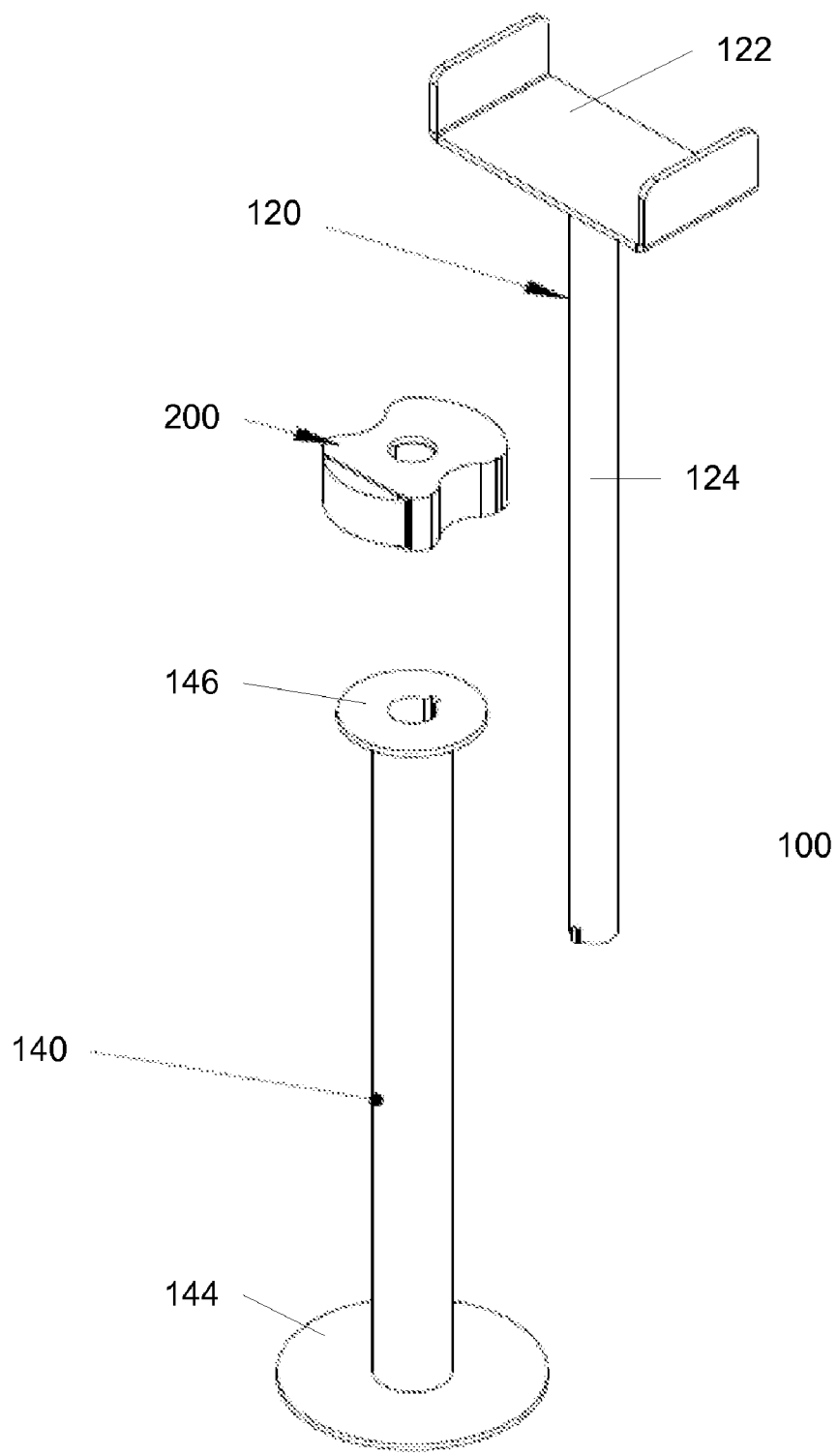
FIG. 1 is an exploded perspective view of an adjustable slideout support apparatus 100.

FIG. 1 is an exploded perspective view of an adjustable slideout support apparatus 100. In one embodiment, the slideout support apparatus 100 comprises a tube assembly 120, a jackscrew assembly 140, and a handle-nut assembly 200.

The tube assembly 120 typically comprises a support portion 122 and a threaded rod 124.

The jackscrew assembly 140 typically comprises a base portion 144, a hollow support section, and an upper support 146 for supporting the handle-nut assembly 200.

Although FIG. 1 shows specific shapes for these elements, other shapes and sizes, or alternative components may be used.

Figure 2:
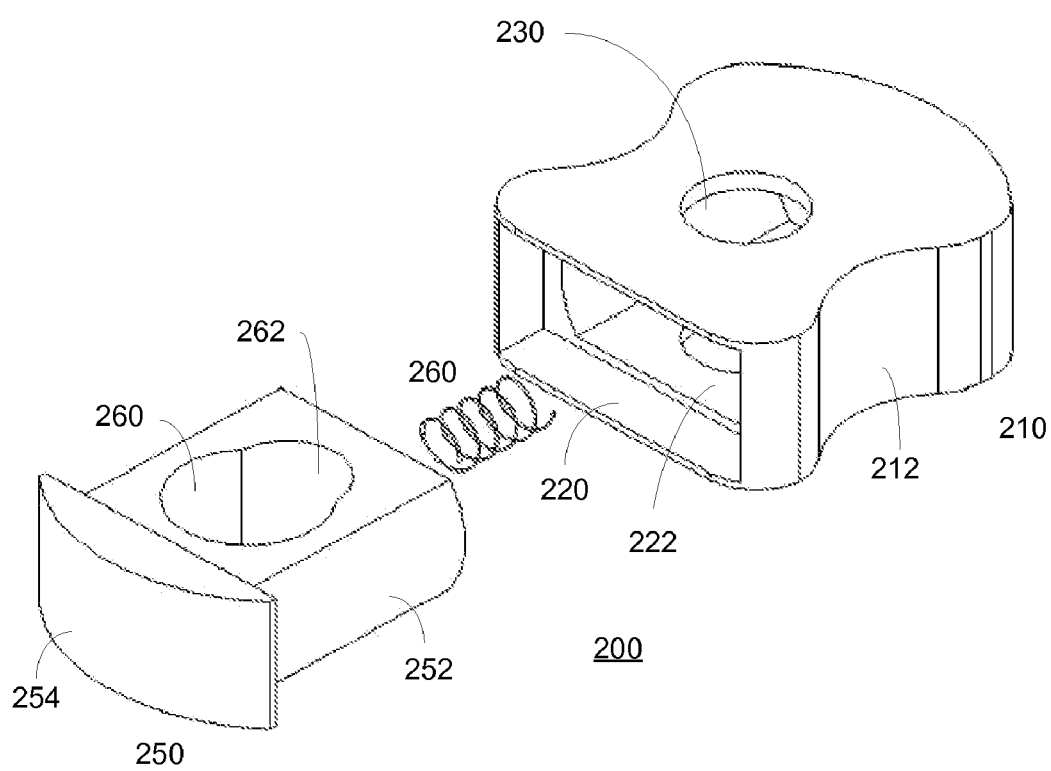
FIG. 2 is an exploded perspective view of a handle-nut assembly 200 of the adjustable slideout support apparatus of FIG. 1.

FIG. 2 is an exploded perspective view of a handle-nut assembly 200 of the adjustable slideout support apparatus of FIG. 1. In this example, the handle-nut assembly 200 comprises a first portion 210, a second portion 250, and a spring 260.

The first portion 210 is generally rounded, and includes a pair of opposed grip recesses 212 to assist in rotating the handle-nut assembly as described below. The first portion includes a mouth 220 and slotted opening 222. The first portion includes a hole 230. A portion of the threaded rod 124 of the tube assembly is placed through the hole 230 and into the hollow portion of the jackscrew assembly 140.

The second portion 250 includes a projecting tab 252 which slides into the slotted opening 222 of the first portion, and a handle 254 which mates with the mouth 220 of the first portion. The projecting tab 252 has a threaded first hole 262 which is approximately the diameter of the hole 230 of the first portion; and a second hole 260 intersecting the first hole and having a larger diameter than the a first hole 262.

Operation

In operation, the handle-nut assembly 200 is positioned on the threaded rod 124 of the tube assembly. A lower portion of the threaded rod extends into the hollow tube of the jackscrew assembly 140 so that the handle-nut assembly 200 can rest on the upper support 146.

A rough positioning of the adjustment device is accomplished by disengaging the threaded first hole 262 of handle-nut assembly 200 from the threaded rod 124 of the tube assembly 120. This disengagement is accomplished by pressing the handle 254 further into the mouth 220 of the handle-nut assembly 200, thereby compressing the spring 260 so that the threaded rod 124 is freely located in the second hole 260 and disengaged from the treaded wall portion of hole 262.

When the device is at the approximate desired height, the handle 254 is released, and the spring 260 forces the threaded first hole 262 wall into the threads of the threaded rod 124.

The entire handle-nut assembly 200 may then be rotated, typically 1-2 turns, to tighten the handle-nut assembly 200 against the upper support 146.

This adjustable slideout support apparatus is an improvement over prior art in ease of use.

In the example described, the apparatus is used as a vertical support. In other applications, the device may be provided in other orientations, such as horizontally to provide a desired spacing.

What is claimed is:

1. An adjustable support apparatus comprising
a handle-nut assembly comprising
    a first portion comprising
        a slotted opening, and
        a first portion hole,
    a second portion comprising
        a tab comprising
            a threaded first hole having a diameter of approximately the diameter of the first portion hole, and
            a second hole intersecting the first hole and having a larger diameter than the first hole,
    a spring positioned in the slotted opening of the first portion and acting upon the tab;
a tube assembly comprising a threaded rod projecting through the first portion hole and projecting through the intersecting first hole and second hole of the tab; and
a jackscrew assembly comprising
    a base portion,
    a hollow support section, and
    a support,
such that a portion of the threaded rod extends into the hollow support section, and such that the handle-nut assembly rests against the support, and such that the spring may be compressed by pushing the tab further into the first portion in order to align the larger second hole with the threaded rod in order to permit the handle-nut assembly to be freely rotated to a desired position, and such that when the spring is released, it forces the projecting tab outwardly with respect to the slotted opening in order to engage the threaded portion of the first hole of the tab against the threaded rod.

2. The adjustable support apparatus of claim 1 wherein the tube assembly further comprises a support portion.

3. The adjustable support apparatus of claim 2 wherein the support portion supports a recreational vehicle.

4. The adjustable support apparatus of claim 1 wherein the first portion of the handle nut assembly further comprises opposed grip recesses.

5. The adjustable support apparatus of claim 1 wherein the first portion of the handle nut assembly further comprises a mouth in proximity to the slotted opening; and the second portion further comprises a handle which mates with the mouth.

6. A method of adjusting the height of a support apparatus, the method comprising providing a support apparatus comprising a handle-nut assembly comprising a first portion comprising a slotted opening and a first portion hole, a second portion comprising a tab comprising a threaded first hole having a diameter of approximately the diameter of the first portion hole, and a second hole intersecting the first hole and having a larger diameter than the a first hole, and a spring positioned in the slotted opening of the first portion and acting upon the tab, a tube assembly comprising a threaded rod projecting through the first portion hole and the intersecting first hole and second hole of the projecting tab, and a jackscrew assembly comprising a base portion, a hollow support section, and a support, such that a portion of the threaded rod extends into the hollow support section, and such that the handle-nut assembly rests against the support, and such that the spring may be compressed by pushing the tab further into the first portion in order to align the larger second hole with the threaded rod in order to permit the handle-nut assembly to be freely rotated to a desired position, and such that when the spring is released, it forces the projecting tab outwardly with respect to the slotted opening in order to engage the threaded portion of the first hole of the tab against the threaded rod;

setting an approximate desired height of the support apparatus by pushing the tab inward in relation to the first portion of the handle-nut assembly and sliding the handle-nut assembly to a desired position on the threaded rod; and finely adjusting the desired height, if required, by turning the handle nut assembly so that it travels with respect to the threaded rod.

* * * * *